UNITED STATES PATENT OFFICE.

CASPAR REITER, OF BAYRISCHZELL-HOCHKREUT, GERMANY.

PROCESS OF MAKING PRACTICALLY ALCOHOL-FREE BEERS.

1,204,315. Specification of Letters Patent. Patented Nov. 7, 1916.

No Drawing. Application filed April 6, 1914. Serial No. 830,037.

*To all whom it may concern:*

Be it known that I, CASPAR REITER, a citizen of the German Empire, residing at Bayrischzell-Hochkreut, in the Province of Oberbayern and State of Bavaria, Germany, have invented a New or Improved Process of Making Practically Alcohol-Free Beers, of which the following is a specification.

This invention relates to a new or improved process of making practically alcohol-free beers and has for its object to produce beers of this kind which will be really palatable and which will not pall on the palate while at the same time being thoroughly wholesome and pure, and being adapted to keep well.

Numerous attempts have been made to make beer practically non-alcoholic as for instance by freeing it from the alcohol by distillation in a vacuum apparatus, but these processes have not heretofore given satisfactory results. There have also been placed on the market malt beers, caramel beers, and sweet beers containing comparatively little alcohol and dark in color, which are obtained by the partial fermentation of the hopped wort, etc., in such a manner that a portion changes into surface fermentation beer and is mixed with the other, unfermented beer, consisting of malt wort or only sugar solution and sugar coloring matter. The beers prepared in this manner in some cases have their alcohol content as low as 1 to 2 per cent. and possess a mild and more or less sugary taste; this alcohol content however, is too high for many purposes and their sweet and somewhat commonplace flavor is a bar to their permanent popularity.

The present invention aims at the manufacture of a practically alcohol-free beer; that is to say, a beer having an alcohol content of not more than 0.5 per cent. and preferably as low as 0.2 to 0.4 per cent. or even lower, and which will keep for some considerable length of time, and in regard to taste, smell and briskness and other qualities will be little if at all inferior to the ordinary alcoholic beers in addition to possessing high nutritive value. In order to attain this it is necessary to avoid sweetness and to give the beer a slight degree of tartness or sourness in addition to the proper bitter flavor. For this purpose according to the present invention the wort is soured or acidulated to the required degree and the fermentation is arrested at such a stage as not to deprive the beer of its practically non-alcoholic character. The souring or acidulation of the wort is preferably effected by means of bacteria (and preferably by the yoghurt milk bacteria—*Bacillus Bulgaricus*) which are capable of forming acids or acid-forming bacteria which can be used in conjunction with yeast. The introduction of the bacteria is made before the wort is hopped but is discontinued when the required degree of acidulation is reached and their action is arrested or suspended by the introduction of the hops.

If desired there may also be added to the wort acids or other chemicals of a kind adapted, without being detrimental to the beer, to beneficially effect the bacteria or to promote their propagation, with or without the property of also repressing the yeast.

If desired in place of souring the acidulating the wort by means of bacteria this may be effected partly or entirely by the introduction into the wort of acids or other chemicals.

In the case of bottled beers and especially of pale ales, in order effectually to arrest or prevent the fermentation, while at the same time insuring the clearness, the beer is pasteurized and filtered, and again pasteurized after the bottling.

In carrying the invention into practice the unhopped wort is preferably treated in a suitable manner with an acid forming and particularly with lactic acid forming bacteria of the well-known recognized kind, preference being given to those lactic acid cultures which are derived from yoghurt milk (*Bacillus Bulgaricus*); and the wort thus treated is kept at the requisite temperature suitable for propagating the growth of the bacteria. Small quantities of calcium carbonate in any suitable form such as, for instance, pure chalk may in some cases favorably affect the increase and thereby also of course the acidulating action of the bacteria, although if said additions are not required they are preferably not used.

If particularly desired, an approximate effect may be obtained by the introduction of acids instead of, or in conjunction with, the aforesaid bacteria, such for instance as lactic, citric, or tartaric acid; but these are less to be recommended as they do not produce effects equal to those obtained by the use of bacteria.

The length of time during which the acid-forming bacteria are allowed to work would vary according to the degree of acidulation required but usually from 3 to 10 hours will be found sufficient. After the required degree of acidulation has been reached the hops or hopped wort or extract of hops are introduced and this will arrest or suspend the acidulating action of the bacteria. After having been hopped the wort is preferably heated up and said heating may be continued for a considerable while in order to obtain good precipitation, especially in the case of pale beers. The wort is then cooled down to the fermenting temperature and there is added to it either a certain amount of beer in a state of fermentation or the requisite quantity of yeast preferably surface fermentation yeast, and it is then allowed to stand for say 6 to 18 hours until noticeable signs of alcoholic fermentation appear. Such fermentation is checked immediately it has gone far enough, preferably by a process of pasteurization carried out in a special pressure vat suited for the purpose and also suited for enabling the process to be carried out on a large scale. This vat, hermetically sealed, is so constructed that the beer after having been warmed therein up to the pasteurization by means of water or steam may also be cooled down therein as nearly as possible to zero by any suitable means, such as cold water, ice water, etc., in order to precipitate all precipitable albuminous and resinous hop particles and to hasten the removal of the dead yeast and bacteria cells. After the complete or partial clarification the pasteurized beer is removed from the vat in such a way as not to disturb it more than can be avoided or to take out with it any of the precipitate; the beer being then filtered if the clarification is incomplete. If required, the beer is then aerated and bottled after which it preferably undergoes further pasteurization. In the case of dark beers, however, the first pasteurization, together with the filtering, may be dispensed with if it is desired to simplify the process; but in this case there would of course be a certain amount of precipitate bottled with the beer.

I claim:—

1. A process of making beer containing but small quantities of alcohol, which consists in acidulating the wort, hopping the acidulated wort, then adding yeast to produce alcoholic fermentation, and checking the fermentation at such a stage as to leave but a small quantity of alcohol in the beer.

2. A process of making beer containing but small quantities of alcohol, which consists in acidulating the wort by treatment with acid-forming bacteria, hopping the acidulated wort, then adding yeast to produce alcoholic fermentation, and checking the fermentation at such a stage as to leave but a small quantity of alcohol in the beer.

3. A process of making beer containing but small quantities of alcohol, which consists in introducing acid-forming bacteria into the wort, permitting the bacterial action to continue until the wort is acidulated, then hopping the wort to stop the bacterial action, adding yeast to produce alcoholic fermentation, and checking the fermentation at such a stage as to leave but a small quantity of alcohol in the beer.

4. A process of making beer containing but small quantities of alcohol, which consists in introducing acid-forming bacteria and substances adapted to facilitate their action into the wort, permitting the bacterial action to continue until the wort is acidulated, then hopping the wort to stop the bacterial action, adding yeast to produce alcoholic fermentation, and checking the fermentation at such a stage as to leave but a small quantity of alcohol in the beer.

5. A process of making beer containing but small quantities of alcohol, which consists in acidulating the wort, hopping the acidulated wort, then adding yeast to produce alcoholic fermentation, and checking the fermentation at such a stage as to leave but a small quantity of alcohol in the beer by pasteurizing the beer, filtering and bottling the beer and again pasteurizing.

In testimony whereof I affix my signature in presence of two witnesses.

CASPAR REITER.

Witnesses:
 A. C. W. EARLE,
 ARTHUR GUBE.